US008139672B2

(12) United States Patent
Gore et al.

(10) Patent No.: US 8,139,672 B2
(45) Date of Patent: Mar. 20, 2012

(54) METHOD AND APPARATUS FOR PILOT COMMUNICATION IN A MULTI-ANTENNA WIRELESS COMMUNICATION SYSTEM

(75) Inventors: Dhananjay Ashok Gore, San Diego, CA (US); Tingfang Ji, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1008 days.

(21) Appl. No.: 11/390,622

(22) Filed: Mar. 27, 2006

(65) Prior Publication Data

US 2007/0071127 A1 Mar. 29, 2007

Related U.S. Application Data

(60) Provisional application No. 60/719,999, filed on Sep. 23, 2005, provisional application No. 60/738,754, filed on Nov. 21, 2005, provisional application No. 60/738,213, filed on Nov. 18, 2005.

(51) Int. Cl.
*H04L 27/00* (2006.01)
(52) U.S. Cl. ........................................................ 375/295
(58) Field of Classification Search .................. 375/130, 375/131, 132, 295, 296
See application file for complete search history.

(56) References Cited

U.S. PATENT DOCUMENTS

| 6,045,618 A | 4/2000 | Raoux et al. |
| 6,229,795 B1 | 5/2001 | Pankaj et al. |
| 7,095,709 B2 * | 8/2006 | Walton et al. ................ 370/208 |
| 7,133,646 B1 * | 11/2006 | Miao ................................ 455/73 |
| 7,408,909 B2 * | 8/2008 | Trainin et al. .................. 370/338 |
| 7,477,187 B2 * | 1/2009 | Rofougaran ............. 342/357.14 |
| 7,483,406 B2 * | 1/2009 | Cleveland et al. ............. 370/328 |
| 7,483,480 B2 * | 1/2009 | Guo et al. ....................... 375/232 |
| 7,535,972 B2 * | 5/2009 | Hammerschmidt et al. .. 375/295 |
| 7,869,416 B2 * | 1/2011 | Ramakrishna et al. ........ 370/345 |
| 2001/0028637 A1 * | 10/2001 | Abeta et al. .................... 370/335 |
| 2002/0193146 A1 * | 12/2002 | Wallace et al. ................ 455/562 |

(Continued)

FOREIGN PATENT DOCUMENTS

JP 2004080110 A 3/2004

(Continued)

OTHER PUBLICATIONS

TIA/EIA/IS-856 cdma2000 High Rate Packet Data Air Interface Specification, Nov. 2000.

(Continued)

Primary Examiner — Jaison Joseph
(74) Attorney, Agent, or Firm — Stanton Braden

(57) ABSTRACT

Systems and methodologies are described that facilitate improved pilot information to MIMO user devices without increasing interference of SISO user devices in a wireless communication environment. A data communication signal can be generated and transmitted at a first power level, and a continuous pilot waveform comprising pilot information related to the data signal can be generated and sent at a second power level below the first transmission power level. Alternatively, a discontinuous pilot waveform can be generated so that it does not overlap with pilot segments in the first waveform, and can be transmitted at the first power level without interfering with the first waveform as received by a SISO user device. A MIMO user device can receive both waveforms, and can employ the pilot waveform to better estimate a MIMO channel for the first waveform.

45 Claims, 12 Drawing Sheets

U.S. PATENT DOCUMENTS

| | | | |
|---|---|---|---|
| 2003/0040275 A1* | 2/2003 | Bridgelall | 455/41 |
| 2003/0235147 A1* | 12/2003 | Walton et al. | 370/204 |
| 2004/0131007 A1* | 7/2004 | Smee et al. | 370/208 |
| 2004/0132494 A1* | 7/2004 | Tirkkonen et al. | 455/562.1 |
| 2004/0146025 A1 | 7/2004 | Hwang et al. | |
| 2005/0024612 A1 | 2/2005 | Hirukawa et al. | |
| 2005/0195763 A1* | 9/2005 | Kadous et al. | 370/328 |
| 2006/0035653 A1* | 2/2006 | Karaoguz et al. | 455/500 |
| 2006/0128309 A1* | 6/2006 | Dateki et al. | 455/41.3 |
| 2006/0233274 A1 | 10/2006 | Le Nir et al. | |
| 2006/0280255 A1* | 12/2006 | Hongming et al. | 375/260 |
| 2007/0030918 A1 | 2/2007 | Kobayashi et al. | |
| 2007/0041457 A1 | 2/2007 | Kadous et al. | |
| 2007/0041464 A1 | 2/2007 | Kim et al. | |
| 2007/0087701 A1 | 4/2007 | Kobayashi et al. | |

FOREIGN PATENT DOCUMENTS

| | | |
|---|---|---|
| JP | 2004229292 A | 8/2004 |
| JP | 2004304760 | 10/2004 |
| JP | 2005073221 A | 3/2005 |
| JP | 2005110228 A | 4/2005 |
| JP | 2006512817 A | 4/2006 |
| JP | 2007513584 T | 5/2007 |
| SU | 1133673 | 1/1985 |
| SU | 1356228 | 11/1987 |
| TW | 588520 | 5/2004 |
| TW | I224405 | 11/2004 |
| WO | WO2005034386 A1 | 4/2005 |
| WO | WO 2005/057870 | 6/2005 |

OTHER PUBLICATIONS international Search Report—PCT/US06/037129, International Search Authority—European Patent Office, Jan. 5, 2007.
Written Opinion—PCT/US06/037129, International Search Authority—European Patent Office, Jan. 5, 2007.
International Preliminary Report on Patentability—PCT/US06/037129. International Bureau of WIPO—Geneva. Switzerland, Mar. 26, 2008.
Taiwanese Search Report-095135159, TIPO-Jan. 9, 2010.
Translation of Office Action in Japanese application 2008-532451 corresponding to U.S. Appl. No. 11/390,622, citing JP2005110228, U520050195763, JP2004304760, WO2005034386, JP2007513584, JP2004080110 and JP2005073221 dated Jan. 11, 2011.

* cited by examiner

METHOD AND APPARATUS FOR PILOT COMMUNICATION IN A MULTI-ANTENNA WIRELESS COMMUNICATION SYSTEM

CLAIM OF PRIORITY UNDER 35 U.S.C. §119

The present Application for Patent claims priority to Provisional Application No. 60/719,999 entitled "METHOD AND APPARATUS FOR PILOT COMMUNICATION IN A MULTI-ANTENNA WIRELESS COMMUNICATION SYSTEM" filed Sep. 23, 2005; Provisional Application No. 60/738,754 entitled "METHOD AND APPARATUS FOR PILOT COMMUNICATION IN A MULTI-ANTENNA WIRELESS COMMUNICATION SYSTEM" filed Nov. 21, 2005; and Provisional Application No. 60/738,213 entitled "METHOD AND APPARATUS FOR PILOT COMMUNICATION IN A MULTI-ANTENNA WIRELESS COMMUNICATION SYSTEM" filed Nov. 18, 2005, all of which are assigned to the assignee hereof and hereby expressly incorporated by reference herein.

BACKGROUND

I. Field

The following description relates generally to wireless communications, and more particularly to facilitating improved channel estimation in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate thereover. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

For instance, in a wireless communication system, a transmitter (e.g., a base station or a terminal) may utilize multiple (T) transmit antennas for data transmission to a receiver equipped with one or more (R) receive antennas. The multiple transmit antennas may be used to increase system throughput by transmitting different data from these antennas and/or to improve reliability by transmitting data redundantly. For example, the transmitter may transmit a given symbol from all T transmit antennas in some coded fashion, and the receiver may receive multiple versions of this symbol via the R receive antennas. These multiple versions of the transmitted symbol generally improve the receiver's ability to recover the symbol.

However, certain users may be configured for receiving signals transmitted from a single antenna. Therefore, a need exists in the art for systems and methods that facilitate communication and channel estimation by users that are capable of communicating with multiple antennas or one antenna in substantially transparent fashion to the user.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with providing improved pilot information to MIMO user devices without increasing interference of SISO user devices in a wireless communication environment. For example, a data communication signal can be generated and transmitted at a first power level, and a second waveform comprising pilot information related to the data signal can be generated and sent at a second power level below the first transmission power level. In such a scenario, the second waveform can be a continuous waveform and will not interfere with the first waveform due to the transmission of the second waveform at a lower power level. Additionally, the second waveform can be generated as a discontinuous waveform so that it does not overlap with pilot segments in the first waveform, in order to avoid interfering with the first waveform as received by a SISO user device, in which case the second waveform need not be transmitted at a lower power level than the data communication signal. A MIMO user device can receive both waveforms, and can employ the second pilot waveform to better estimate a channel for the first waveform (e.g., the MIMO user device can receive both waveforms concurrently).

According to another aspect, a method of performing pilot communication in a wireless communication environment can comprise transmitting a code-division multiplexed (CDM) waveform that is continuous from a first antenna at a base station, and transmitting a second waveform comprising pilot information related to the CDM waveform from a second antenna at the base station. The CDM waveform may comprise orthogonal frequency-division multiplexed (OFDM) pilot segments that are employed to estimate a channel for a single-input, single-output (SISO) user device, and the second waveform may comprise OFDM pilot segments that are employed to estimate a channel for a multiple-input, multiple-output (MIMO) user device. The second waveform may be discontinuous and the pilot segments of the second waveform may be arranged such that they do not overlap the pilot segments of the CDM waveform. Alternatively, the second waveform may be continuous and may be transmitted at a power level approximately 20 dB below a power level at which the CDM waveform is transmitted. The method can further comprise providing the second waveform according to a predetermined pattern, such as once every N transmissions of the CDM waveform, where N is an integer greater than 1. Still furthermore, the method can comprise terminating transmission of the second waveform upon switching from a low-throughput modulation format to a high-throughput modulation format for transmission of the CDM waveform, such as from quadrature phase shift keying (QPSK) modulation format to a 64-quadrature amplitude modulation (QAM) format.

According to another aspect, an apparatus that facilitates providing pilot information for channel estimation in a wireless communication environment can comprise a plurality of antennas and a processor, coupled to the plurality of antennas, wherein the processor is configured to transmit a CDM waveform comprising OFDM pilot segments from a first antenna for a SISO user device and a second waveform comprising pilot information related to the CDM waveform from a second antenna for a MIMO user device. The processor can generate the CDM waveform as a continuous waveform, comprising data segments and the OFDM pilot segments. The apparatus can further comprise a low-power waveform generator that generates the second waveform as a continuous waveform. The processor can transmit the first waveform at a first power level and the second waveform at a second power level approximately 20 dB below the first power level. Alternatively, the second waveform may be a discontinuous waveform comprising OFDM pilot segments that do not overlap with the pilot segments of the CDM waveform. In this case, the processor can transmit the CDM waveform and the second waveform at approximately the same power level. The processor may furthermore transmit the second waveform according to a predetermined pattern, which can be, for instance, once every N transmissions of the CDM waveform, where N is an integer greater than 1, or any other suitable transmission pattern.

According to yet another aspect, a wireless communication apparatus can comprise means for generating a CDM waveform comprising OFDM pilot segments, means for generating an OFDM pilot waveform, and means for transmitting the CDM waveform from a first antenna and transmitting the OFDM pilot waveform from a second antenna. The OFDM pilot waveform may be discontinuous and may comprise pilot segments that do not overlap with pilot segments in the CDM waveform. In this case, the apparatus can further comprise means for transmitting the CDM waveform and the OFDM pilot waveform at a substantially similar power level. Additionally or alternatively, the OFDM pilot waveform may be a continuous waveform that comprises pilot segments that overlap with pilot segments in the CDM waveform. The apparatus may further comprise means for transmitting the continuous OFDM pilot waveform at a power level approximately 20 dB below a transmission power level of the CDM waveform.

A further aspect relates to a computer-readable medium having stored thereon computer-executable instructions for generating a CDM waveform comprising OFDM pilot segments, generating an OFDM pilot waveform comprising pilot information related to the CDM waveform, and transmitting the CDM waveform from a first antenna and concurrently transmitting the OFDM waveform from a second antenna. The instructions can further comprise generating the OFDM pilot waveform as a discontinuous waveform with pilot segments that do not overlap pilot segments in the CDM waveform, and transmitting the OFDM pilot waveform and the CDM waveform at a same power level. Additionally or alternatively, the instructions can further comprise generating the OFDM pilot as a continuous waveform comprising pilot segments that overlap with pilot segments in the CDM waveform, and transmitting the OFDM pilot waveform at a power level approximately 15-25 dB below a transmission power level for the CDM waveform.

Yet another aspect relates to a processor that executes instructions for increasing throughput in a wireless communication environment, the instructions comprising generating a CDM waveform that has OFDM pilot segments, generating an OFDM pilot waveform that has pilot information related to the CDM waveform, and transmitting the CDM waveform from a first antenna and transmitting the OFDM pilot waveform from a second antenna. The instructions further comprise generating the OFDM pilot waveform as a discontinuous waveform having discontinuities between pilot segments, wherein the discontinuities are generally aligned with the pilot segments in the CDM waveform, and transmitting the discontinuous CDM waveform and the OFDM pilot waveform at approximately the same power level. Additionally or alternatively, the instructions can comprise generating the OFDM pilot waveform as a continuous waveform having pilot segments that overlap the pilot segments in the CDM waveform, and transmitting the continuous OFDM pilot waveform at a power level approximately 20 dB below a transmission power level for the CDM waveform.

According to yet another aspect, a method of performing pilot communication in a wireless communication environment can comprise transmitting a CDM waveform having pilot segments at a first transmission power level from a first antenna at a base station, transmitting an OFDM pilot waveform comprising pilot segments related to the CDM waveform the first transmission power level from a second antenna at the base station, and temporarily reducing the transmission power of the OFDM pilot waveform to a second transmission power level during transmission of the pilot segments in the CDM waveform to reduce interference between the waveforms. The second transmission power level may be approximately 20 dB below the first transmission power level.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
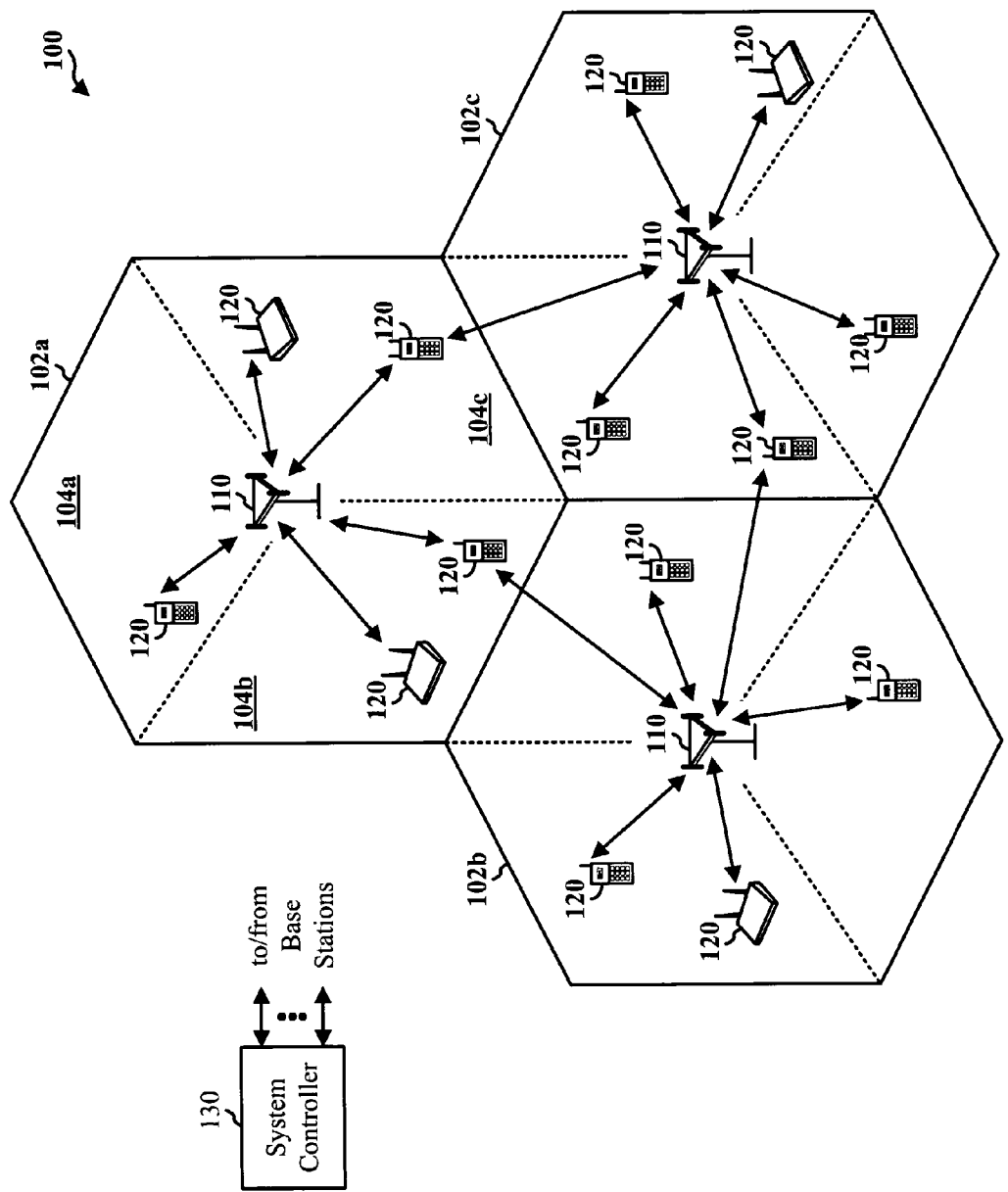
FIG. 1 illustrates a wireless communication system with multiple base stations and multiple terminals, in accordance with one or more aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any embodiment or design described herein as "exemplary" is not necessarily to be construed as preferred or advantageous over other embodiments or designs.

FIG. 1 illustrates a wireless communication system 100 with multiple base stations 110 and multiple terminals 120, in accordance with one or more aspects. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas (e.g., three smaller areas, according to FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

After registration, which allows an access terminal to access an access network, access terminal 120 and one of the access points, such as access point 110, establish a communication link using a predetermined access procedure. In the connected state resulting from the predetermined access procedure, access terminal 120 can receive data and control messages from access point 100 and is able to transmit data and control messages to access point 100. Access terminal 120 continually searches for other access points that may be added to an active set of access terminal 120. An active set comprises a list of access points capable of communicating with access terminal 120. When such an access point is found, access terminal 120 can calculate a quality metric of the access point's forward link, which may comprise a signal-to-interference and-noise ratio (SINR). An SINR may be determined in accordance with a pilot signal. Access terminal 120 searches for other access points and determines SINRs for respective access points. Concurrently, access terminal 120 calculates a quality metric of a forward link for each access point in the active set of access terminal 120. If the forward link quality metric from a particular access point is above a predetermined add threshold or below a predetermined drop threshold for a predetermined period of time, access terminal 120 can report such information to access point 110. Subsequent messages from access point 110 may direct access terminal 120 to add to or to delete from the access terminal 120 active set the particular access point.

Access terminal 120 can additionally select a serving access point from the access terminal's 120 active set based on a set of parameters. A serving access point is an access point that is selected for data communication by a particular access terminal or an access point that is communicating data to the particular access terminal. The set of parameters may comprise any one or more of present and previous SINR measurements, a bit-error-rate, a packet-error-rate, for example, and any other known or desired parameters. Thus, for example, the serving access point may be selected in accordance with the largest SINR measurement. Access terminal 120 can then broadcast a data request message (DRC message) on a data request channel (DRC channel). The DRC message can contain a requested data rate or, alternatively, an indication of a quality of the forward link (e.g., measured SINR, a bit-error-rate, a packet-error-rate, . . . ) and the like. Access terminal 120 may direct the broadcast of the DRC message to a specific access point by the use of a code, which uniquely identifies the specific access point.

The data to be transmitted to access terminal 120 can be received by access network controller 130. Thereafter, access network controller 130 may send the data to all access points in the access terminal 120 active set. Alternatively, access network controller 130 may first determine which access point was selected by the access terminal 120 as the serving access point, and then send the data to the serving access point. The data can be stored in a queue at the access point(s). A paging message may then be sent by one or more access points to access terminal 120 on respective control channels. Access terminal 120 demodulates and decodes the signals on one or more control channels to obtain the paging messages.

At the forward link, the access point may schedule data transmissions to any of the access terminals that received the paging message. An exemplary method for scheduling transmission is described in U.S. Pat. No. 6,229,795, entitled "System for Allocating Resources in a Communication System," assigned to the present assignee. However, other approaches for scheduling may also be utilized. The access point uses the rate control information received in the DRC message from each access terminal to efficiently transmit forward link data at the highest possible rate. Because the rate of data may vary, the communication system operates in a variable rate mode. The access point determines the data rate at which to transmit the data to access terminal 120 based on the most recent value of the DRC message received from the access terminal 120. Additionally, the access point uniquely identifies a transmission to access terminal 120 by using a spreading code, which is unique to that mobile station. However, other approaches may also be utilized. This spreading code may be a long pseudo noise (PN) code, for example a spreading code defined by the IS-856 standard.

Access terminal 120, for which the data packet is intended, receives and decodes the data packet. Each data packet is associated with an identifier, such as a sequence number, which is used by access terminal 120 to detect either missed or duplicate transmissions. In such an event, access terminal 120 communicates the sequence numbers of the missing data packets via the reverse link data channel. Access network controller 130, which receives the data messages from access terminal 120 via the access point communicating with access terminal 120, then indicates to the access point what data units were not received by access terminal 120. The access point then schedules a re-transmission of such data packets.

Figure 2:
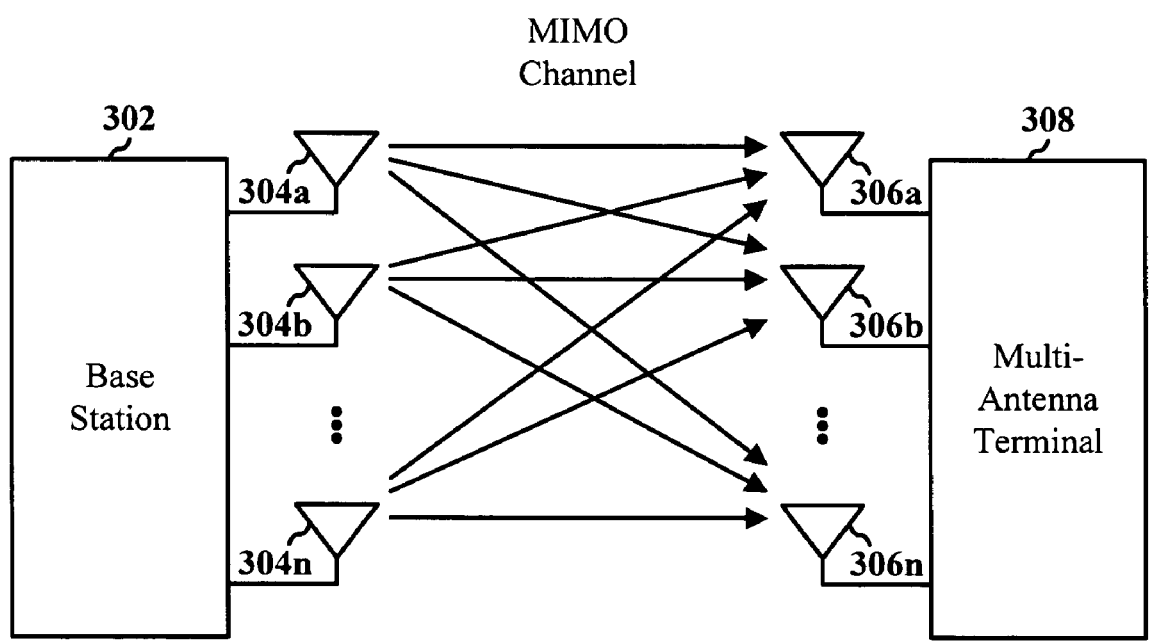
FIG. 2 is an illustration of a multiple-input multiple-output (MIMO) channel formed by T transmit antennas at base station and multiple (R) receive antennas at a terminal, in accordance with various aspects described herein.

FIG. 2 illustrates a multiple-input multiple-output (MIMO) channel formed by T transmit antennas 304a through 304n at base station 302 and multiple (R) receive antennas 306a through 306n (where n is an integer) at a terminal 308, in accordance with various aspects described herein. The MIMO channel may be characterized by an R×T channel response matrix H(k), for each transmission frequency k in the case of FDMA, multicarrier CDMA, transmitter, or subband in the case of an OFDM transmitter, which may be given as:

$$H(k) = \begin{bmatrix} h_{1,1}(k) & h_{1,2}(k) & \cdots & h_{1,T}(k) \\ h_{2,1}(k) & h_{2,2}(k) & \cdots & h_{2,T}(k) \\ \vdots & \vdots & \ddots & \vdots \\ h_{R,1}(k) & h_{R,2}(k) & \cdots & h_{R,T}(k) \end{bmatrix} \quad \text{Eq. (1)}$$
$$= [\underline{h}_1(k)\underline{h}_2(k)\ldots\underline{h}_T(k)],$$

where $h_{j,i}(k)$, for j=1, . . . , R and i=1, . . . T, denotes the complex channel gain between transmit antenna i and receive antenna j for each k; and $h_i(k)$ is an R×1 channel response vector for transmit antenna i, which is the i-th column of H(k).

In the case of the MIMO system, or any SDMA or other multi-antenna scheme system, the receiver and transmitter can estimate each channel in order to determine capacity, rate, and/or power parameters for each channel. This estimation, which can involve calculating signal-to-noise ratios, is more complex for the MIMO receiver. In a system with mixed users, (e.g., both SISO and MIMO users), there some transmission resources can remain unused during transmissions to SISO users. However, using other antennas to transmit pilots or other control information to MIMO users during SISO transmissions may increase interference and cause decoding errors for the SISO user.

According to an aspect, in a scenario where system resources are allocated in whole to one user at a time, users can be time-division multiplexed with the resources allocated to a given user for a given duration of time. In such a scenario, when resources are allocated to SISO users, capability to estimate rate (DRC) that can be supported by MIMO users that are not being transmitted to in that slot can be provided. In certain embodiments, a continuous low power pilot may be transmitted from some or all of the antennas not transmitting to the SISO user for MIMO users. In this manner DRC estimation capability can be provided to the MIMO users even when they are not scheduled.

Figure 3:
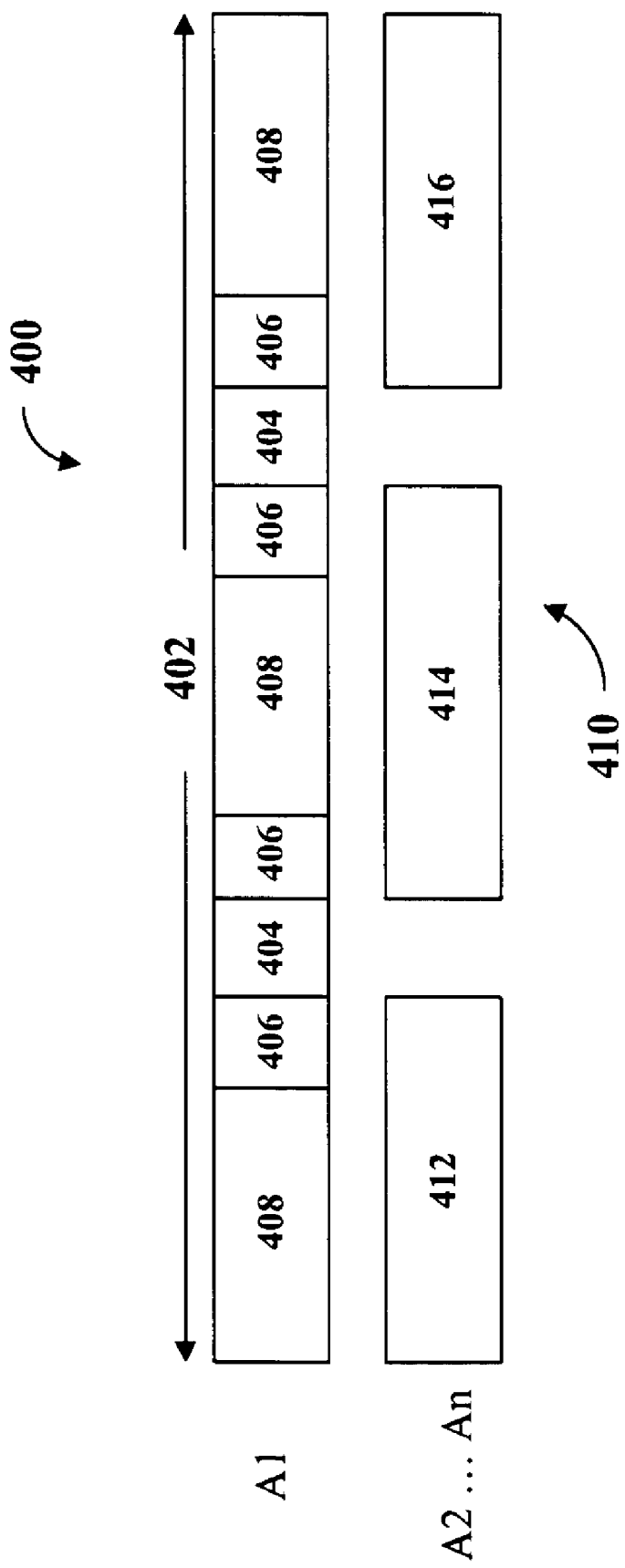
FIG. 3 illustrates a forward link structure, in accordance with one or more aspects described herein.

FIG. 3 illustrates a forward link structure 400, in accordance with one or more aspects described herein. It will be appreciated that the below-described time durations, chip lengths, value ranges, etc., are presented as examples only, and other time durations, chip lengths, value ranges, etc., may be used without departing from the underlying principles of operation of the communication system. The term "chip" is a unit of a code-spreading signal having two possible values.

The forward link 400 is defined in terms of frames. A frame is a structure comprising time-slots 402, each time-slot 402 being, for example, 2048 chips long, corresponding to an approximately 1.66 ms time-slot duration. Each time-slot 402 includes pilot bursts 404. Each pilot burst 404 may be 96 chips long, centered about a mid-point of its associated time-slot 402. The pilot bursts 404 comprise a pilot channel signal that is covered or modulated by a code, such as a Walsh code with index 0. A forward medium access control channel (MAC) 406 forms four bursts, which are transmitted immediately before and immediately after the pilot burst 404. The MAC 406 may be composed of up to 64 code channels, which may be orthogonally covered by 64-ary code, such as a Walsh code. Each code channel is identified by a MAC index, which has a value between 1 and 64, and identifies a unique 64-ary covering Walsh code. The forward link traffic channel or the control channel payload is sent in the remaining portions 408 of the time-slot 402. The traffic channel carries user data, while the control channel carries control messages, and may also carry user data.

In order to provide improved estimation for MIMO users while reducing interference for the SISO user, a pilot waveform 410, which may be discontinuous, may be transmitted from antennas A2, while the waveform 402 is transmitted from antenna A1. In this case, pilot waveform 410 includes segments 412, 414 and 416 that do not overlap with all or most of pilot segments 404 of waveform 402. For instance, discontinuities between pilot segments 412, 414 and 416 can be approximately 96 chips long and can be aligned with pilot segments 404 of waveform 402. If desired, pilot waveform 410 may be transmitted at a power level below that of waveform 402, such as 20 dB below the transmission power of waveform 402. However, pilot waveform 410 may be transmitted at any desired power level, including that of waveform 402 when it is discontinuous (e.g., it does not overlap pilot segments 404 in waveform 402, and therefore will not interfere therewith). Additionally and/or alternatively, transmission power can be reduced for waveform 410 during transmission of the pilot segments 404, and MIMO pilot segments 412, 414 and 416 can be transmitted at a lower power level during pilot 404 intervals. For instance, pilot segments 412, 414 and 416 and/or waveform 410 can be continuous and can be transmitted at a same power level as waveform 402, while interference between pilot segments 412, 414 and 416 and pilot segments 404 is mitigated by reducing transmission power of waveform 410 during transmission of the pilot segments 404.

According to another aspect, waveform 410 can be continuous (e.g., the waveform need not comprise gaps between segments 412, 414 and 416) and can comprise data in addition to pilot information. In such cases, waveform 410 may be transmitted at approximately 20 dB less than the waveform 402 to mitigate interference with waveform 402 and/or pilot segments 404 therein while still providing sufficient power to estimate the channel for the MIMO users. It should be noted that other differences in power (e.g., 15 dB, 25 dB, 17 dB, . . . ) between waveforms 402 and 410 may also be utilized.

It will be appreciated that waveform 402 may be a code-division multiplexed (CDM) waveform with pilot segments 402 that are orthogonal frequency-division multiplexed (OFDM). Pilot segments 412, 414 and 416 may similarly be orthogonal frequency-division multiplexed to have different carrier frequencies than pilots 402 and may thus be concurrently transmitted with pilot segments 404, at a same or different power level, without interfering therewith. It will be further appreciated that waveform 410 can be transmitted on a periodic basis that need not correspond to every CDM transmission from antenna A1. For instance, transmission of waveform 410 can occur upon every other transmission of waveform 402, upon transmission of a group of waveforms 402, or upon any desired permutation of transmissions from antenna A1. Moreover, transmission of waveform 410 can be varied in response to detected circumstances, such as loading and the like. For example, it may be desirable to reduce or increase a frequency with which waveform 410 is transmitted with respect to waveform 402 transmission in response a determination that a loading parameter has crossed a predetermined acceptable threshold level.

It should be noted that less than all of the segments 412, 414, and 416 may be transmitted from a given antenna, effectively blanking certain segments during a given time from an antenna. In one exemplary aspect, where there are four transmit antennas, antenna 1 may transmit waveform 402, antenna 2 may transmit segment 412, antenna 3 may transmit segment 414, and antenna 4 may transmit segment 416, during a give time slot. Additionally, each antenna may transmit more than one, but less than all, of segments 412, 414, and 416, during a given time slot. The selection of segments 412, 414, and 416 for a given antenna may vary between time slots, or may be the same. The variance may be based upon channel conditions, or some predetermined pattern, e.g. a randomization based upon a unitary matrix. The variance may be based upon channel conditions, mapping scheme or some predetermined pattern, e.g. a randomization based upon a unitary matrix. Further, the mapping scheme utilized may be one that is depicted and described in co-pending U.S. patent application Ser. No. 11/261,823, entitled "Method And Apparatus For Providing Antenna Diversity In A Wireless Communication System," which is incorporated by reference herein in its entirety.

Figure 4:
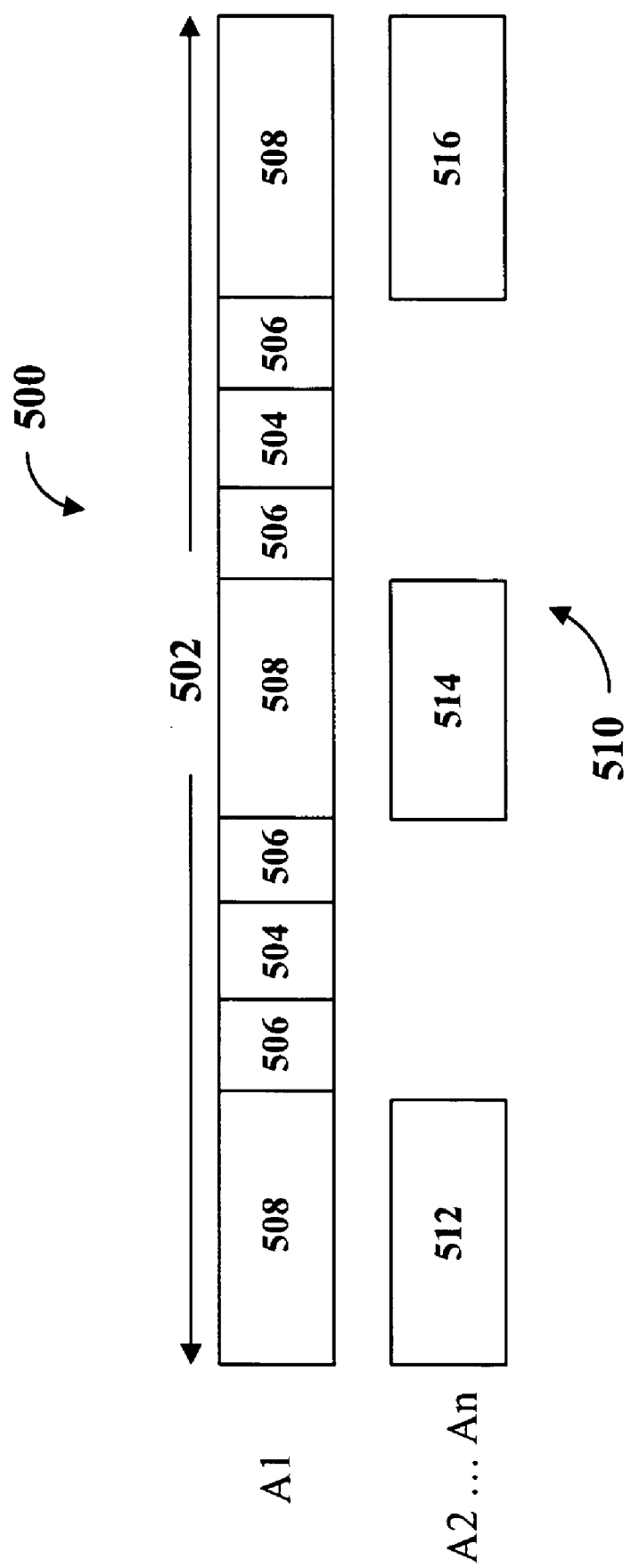
FIG. 4 illustrates a forward link structure, in accordance with one or more aspects described herein.

FIG. 4 illustrates a forward link structure 500, in accordance with one or more aspects described herein. It will be appreciated that the below described time durations, chip lengths, value ranges, etc., are presented as examples only, and other time durations, chip lengths, value ranges, etc., may be used without departing from the underlying principles of operation of the communication system. The term "chip" is a unit of a code-spreading signal having two possible values.

In FIG. 4, in order provide improved estimation for MIMO users, a pilot waveform 510, which may be discontinuous, may be transmitted from antenna A2, while a continuous communication waveform 502 is transmitted from antenna A1. In this case, waveform 510 includes segments 512, 514 and 516 that do not overlap with all or most of pilot segments 504 or the MAC segments 506 of waveform 502. For example, in a case where pilot segments 504 are 96 chips long and MAC segments 506 are 64 chips long, the discontinuities (e.g., gaps, . . . ) between pilot segments 512, 514 and 516 in waveform 510 can be in the range approximately 224 chips in length and aligned with the pilot segments 504 and MAC segments 506 of waveform 502. According to a related example, the discontinuities between pilot segments 512, 514 and 516 can range in length from approximately 96 chips to approximately 224 chips. If desired, pilot waveform 510 can be transmitted at a power level below that of waveform 502, such as 20 dB below the transmission power of waveform 502. However, pilot waveform 510 can be transmitted at any desired power level, including that of waveform 502 when it is discontinuous (e.g., it does not overlap pilot segments 504 and MAC segments 506 in waveform 502, and therefore will not interfere therewith).

Additionally and/or alternatively, transmission power for waveform 510 can be reduced during transmission of the pilot segments 504, and pilot segments 512, 514 and 516 can be transmitted at a regular power level during pilot 504 intervals. For instance, pilot segments 512, 514 and 516 and/or waveform 510 can be continuous and can be transmitted at a same power level as wave form 502, while interference between pilot segments 512, 514 and 516 and pilot segments 504 is mitigated by reducing transmission power of waveform 510 during transmission of the pilot segments 504.

According to another aspect, waveform 510 may be continuous (e.g., the waveform need not comprise gaps between segments 512, 514 and 516) and may comprise data in addition to pilot information. In such cases, waveform 510 may be transmitted at some power level below that of waveform 502 (e.g., approximately 20 dB less than the waveform 502). Thus, interference can be minimized to waveform 502 while still providing sufficient power for channel estimation by MIMO users. It should be noted that other differences in power (e.g., 15 dB, 25 dB, 17 dB, . . . ) between waveforms 502 and 510 may also be utilized.

Additionally, it will be appreciated that waveform 502 may be a CDM waveform with OFDM pilot segments 504. Pilot segments 512, 514 and 516 may similarly be OFDM and may thus be concurrently transmitted with pilot segments 504 without interfering therewith (e.g., pilot segments 504 and 512, 514 and 516 can overlap). It will be further appreciated that waveform 510 can be transmitted on a periodic basis that need not exhibit a one-to-one correspondence to every CDM transmission from antenna A1. For instance, transmission of waveform 510 can occur upon every other transmission of waveform 502, upon transmission of a group of waveforms 502, or upon any desired permutation of transmissions from antenna A1. Moreover, transmission of waveform 510 can be varied in response to detected parameters, such as loading and the like. For example, it may be desirable to reduce or increase a frequency with which waveform 510 is transmitted with respect to waveform 502 transmission in response a determination that a percent loading parameter has crossed a predetermined acceptable threshold level.

It should be noted that less than all of the segments 512, 514, and 516 may be transmitted from a given antenna, effectively blanking certain segments during a given time from an antenna. In one exemplary aspect, where there are four transmit antennas, antenna 1 may transmit waveform 502, antenna 2 may transmit segment 512, antenna 3 may transmit segment 514, and antenna 4 may transmit segment 516, during a give time slot. Additionally, each antenna may transmit more than one, but less than all, of segments 512, 514, and 516, during a given time slot. The selection of segments 512, 514, and 516 for a given antenna may vary between time slots, or may be the same. The variance may be based upon channel conditions, mapping scheme or some predetermined pattern, e.g. a randomization based upon a unitary matrix. Further, the mapping scheme utilized may be one that is depicted and described in co-pending U.S. patent application Ser. No. 11/261,823, entitled "Method And Apparatus For Providing Antenna Diversity In A Wireless Communication System," which is incorporated by reference herein in its entirety.

Figure 5:
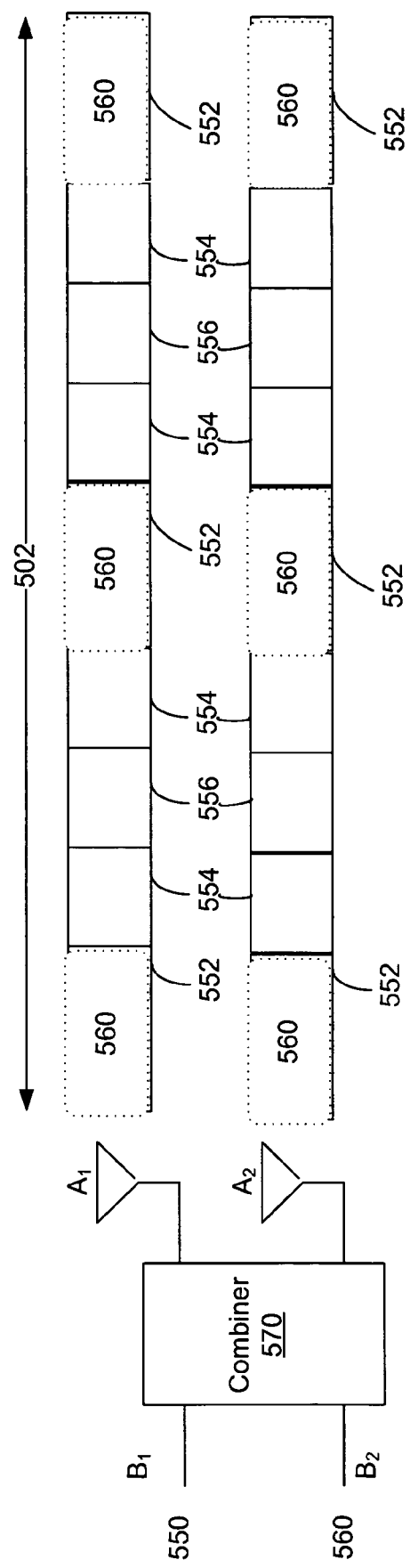
FIG. 5 illustrates a forward link structure, in accordance with one or more aspects described herein.

FIG. 5 illustrates another forward link structure 502, in accordance with one or more aspects described herein. It will be appreciated that the below described time durations, chip lengths, value ranges, etc., are presented as examples only, and other time durations, chip lengths, value ranges, etc., may be used without departing from the underlying principles of operation of the communication system. The term "chip" is a unit of a code-spreading signal having two possible values.

In FIG. 5, CDM waveform 550 and pilot waveforms 560 may be transmitted over virtual antennas instead of physical antennas where the virtual antennas are some combination of the physical antennas. The waveforms transmitted on physical antennas A1 and A2 are predetermined or random combinations of the waveforms transmitted on virtual antennas B1 and B2. In such a case, a virtual antenna B1 carries waveform 550 and virtual antenna B2 carries waveform 560. To map the virtual antennas B1 and B2 to physical antennas A1 and A2 a combiner 570 is used to multiply the signals from the virtual antennas. Certain aspects and embodiments of approaches of mapping based upon such a combiner 570, which may utilize a unitary or orthonormal matrix, are depicted and described in U.S. patent application Ser. No.

11/261,823, entitled "Method And Apparatus For Providing Antenna Diversity In A Wireless Communication System," and U.S. patent application No. 11/377,458, entitled "Selective Virtual Antenna Transmission," both of which are incorporated herein by reference in its entirety.

The mapped CDM waveform 550 is then transmitted on, in some aspects, from all of the physical antennas during each slot 502. As can be seen, the pilot segments 554 and MAC segments 556 of the waveform 550 are not overlapped by pilot signal 560. The data segments 552 of waveform 552 are overlapped in time and from the same antenna as pilot signal 560.

With regard to FIGS. 3, 4, and 5, transmission of waveforms 410, 510 and 560 can be suspended and or turned off as desired under certain circumstances. For instance, it may be desirable to suspend or terminate transmission of waveforms 410, 510 and 560 when a transmission protocol is varied, such as upon a change from a QPSK protocol to a 64-QAM protocol or the like. According to this aspect, transmission of waveforms 410, 510 and/or 560 can be suspended or terminated upon any such switch from a relatively lower-throughput modulation format to a higher-throughput modulation format. Thus, waveforms 410, 510 and 560 need not be transmitted on all interlaces. Further, in some cases the waveforms 410, 510 and 560 may be provided every other time slot, and blanked in the intervening time slots, or provided according to some other predetermined pattern. Additionally, the waveforms 410, 510 and 560 may be transmitted, or blanked, according to the data rate of the communication waveform. For example, when the first waveform carries data with very high spectral efficiency, the secondary waveform (e.g., pilot waveform 410, 510, 560 . . . ) may be turned off.

Figure 6:
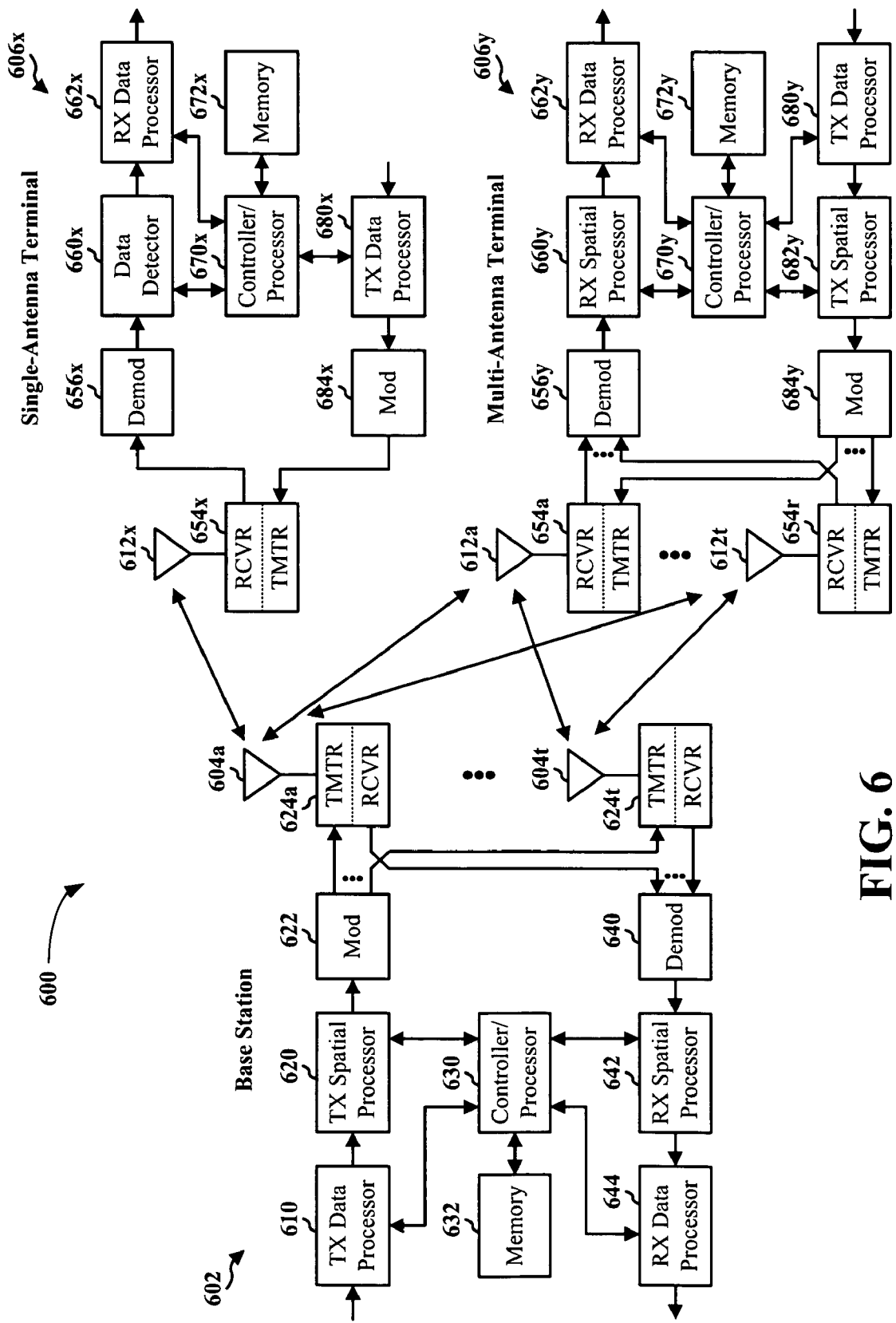
FIG. 6 illustrates a block diagram of system that facilitates providing a low-power pilot signal in addition to a communication signal, in accordance with various aspects.

FIG. 6 illustrates a block diagram of system 600 that facilitates providing a low-power pilot signal in addition to a communication signal, in accordance with various aspects. System 600 can comprise a base station 602, a single-antenna terminal 606x, and a multi-antenna terminal 606y. At base station 602, a transmit (TX) data processor 610 receives data for one or more terminals, processes (e.g., encodes, interleaves, symbol maps, . . . ) the data based on one or more coding and modulation schemes, and provides modulation symbols. TX data processor 610 typically processes the data for each terminal separately based on a coding and modulation scheme selected for that terminal. TX data processor 610 obtains output symbols for each terminal and provides the symbols for a single antenna for a SISO terminal, such as terminal 606x, or onto multiple antennas for a MIMO user, such as terminal 606y. TX data processor 610 further multiplexes pilot symbols onto a carrier, carriers, or subbands.

A TX spatial processor 620, which may or may not be present, may also perform the previously described functions. A modulator (Mod) 622 processes the transmit symbols for each transmit antenna (e.g., for OFDM, CDMA, or some other modulation technique), and generates signals for that transmit antenna. Each transmitter unit 624 processes (e.g., converts to analog, amplifies, filters, and frequency upconverts) its output sample stream and generates a modulated signal. T modulated signals from transmitter units 624a through 624t are transmitted from T antennas 604a through 604t, respectively.

At each terminal 606, one or multiple antennas 612 receive the modulated signals transmitted by base station 602, and each antenna provides a received signal to a respective receiver unit (RCVR) 654. Each receiver unit 654 processes (e.g., amplifies, filters, frequency downconverts, digitalizes, . . . ) it's receive signal and provides received samples to a demodulator (Demod) 656. Demodulator 656 processes the received signal for each receive antenna 612, obtains frequency-domain received symbols for the K total subbands, provides received symbols for the assigned subbands, and provides received pilot symbols for the subbands used for pilot transmission.

For single-antenna terminal 606x, a data detector 660x obtains received symbols from demodulator 656x and derives channel estimates for the channels based on the received pilot symbols. For multi-antenna terminal 606y, a receive (RX) spatial processor 660y obtains received symbols from demodulator 656y and derives channel estimates for the channels based on the received pilot symbols. RX spatial processor 660y may implement a minimum mean square error (MMSE) technique, a zero-forcing (ZF) technique, a maximal ratio combining (MRC) technique, a successive interference cancellation technique, or some other receiver processing technique. For each terminal, an RX data processor 662 processes (e.g., symbol demaps, deinterleaves, decodes, . . . ) the detected symbols and provides decoded data for the terminal. In general, the processing by each terminal 606 is complementary to the processing by base station 602.

Each terminal 606 may generate feedback information for the data transmission to that terminal. For example, each terminal 606 may estimate the SNRs, DRC, CQI, or other information, e.g., based on the received pilot symbols. Each terminal 606 may select one or more coding and modulation schemes, one or more packet formats, one or more virtual antennas to use for data transmission, one or more orthonormal matrices, and so on based on the SNR estimates and/or other information. Each terminal 606 may also generate acknowledgments (ACKs) for correctly received data packets. The feedback information may include the SNR estimates, the selected coding and modulation schemes, the selected virtual antenna(s), the selected orthonormal matrix (ces), the selected subband(s), ACKs, information used for power control, some other information, or any combination thereof. The feedback information is processed by a TX data processor 680, further processed by a TX spatial processor 682 if multiple antennas are present, modulated by a modulator 684, conditioned by transmitter unit(s) 654, and transmitted via antenna(s) 612 to base station 602. At base station 602, the modulated signals transmitted by terminals 606x and 606y are received by antennas 604, conditioned by receiver units 624, and processed by a demodulator 640, an RX spatial processor 642, and an RX data processor 644 to recover the feedback information sent by the terminals. A controller/processor 630 uses the feedback information to determine the data rates and coding and modulation schemes to use for the data transmission to each terminal, as well as to generate various controls for TX data processor 610 and TX spatial processor 620. Controllers/processors 630, 670x and 670y control the operation of various processing units at base station 602 and terminals 606x and 606y, respectively. Memory units 632, 672x and 672y store data and program codes used by base station 602 and terminals 606x and 606y, respectively.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

Figure 7:
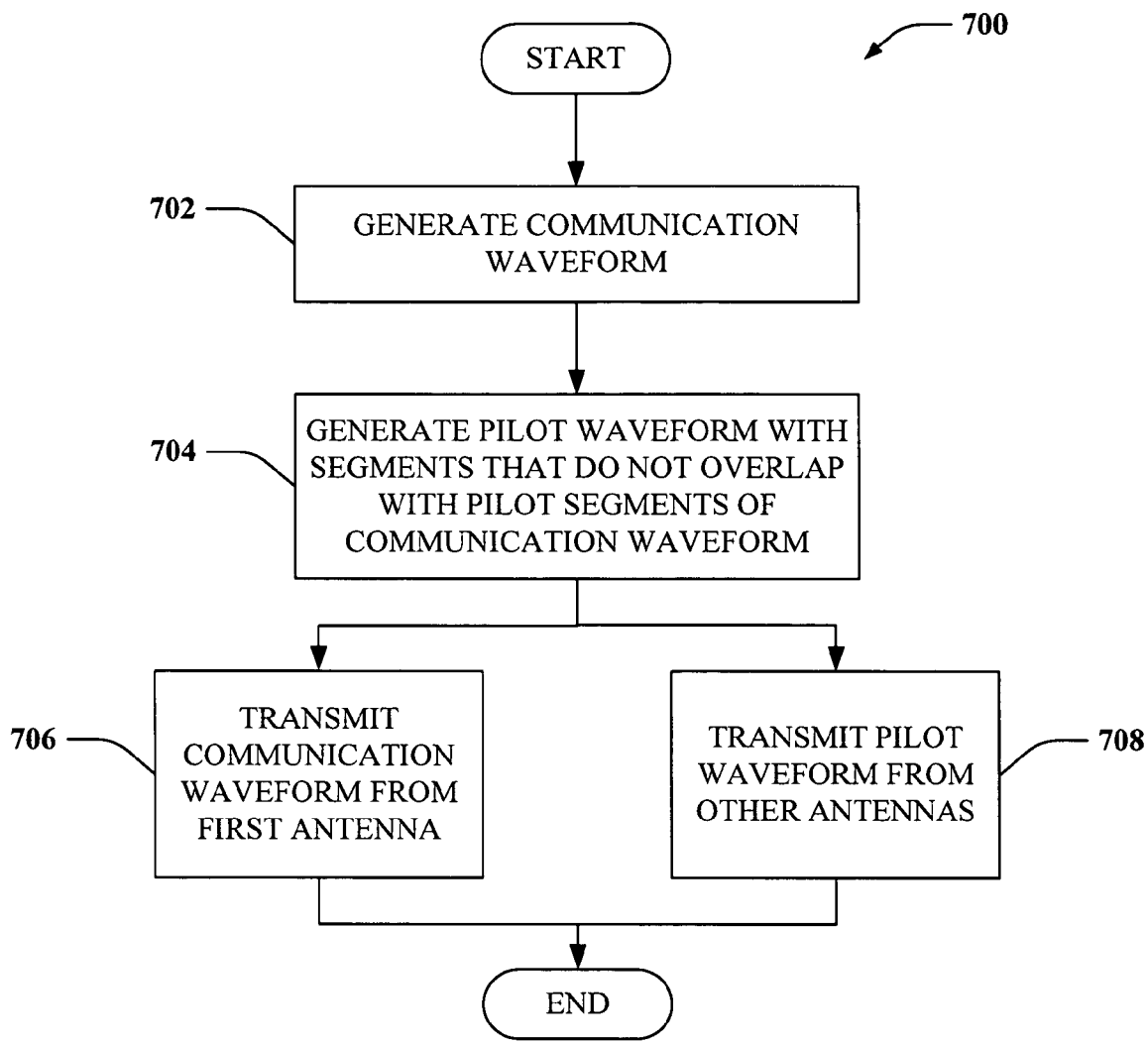
FIG. 7 illustrates a methodology for providing improved channel estimation for MIMO user devices without adversely affecting extant SISO users communicating within the same wireless communication environment, in accordance with one or more aspects.
Figure 8:
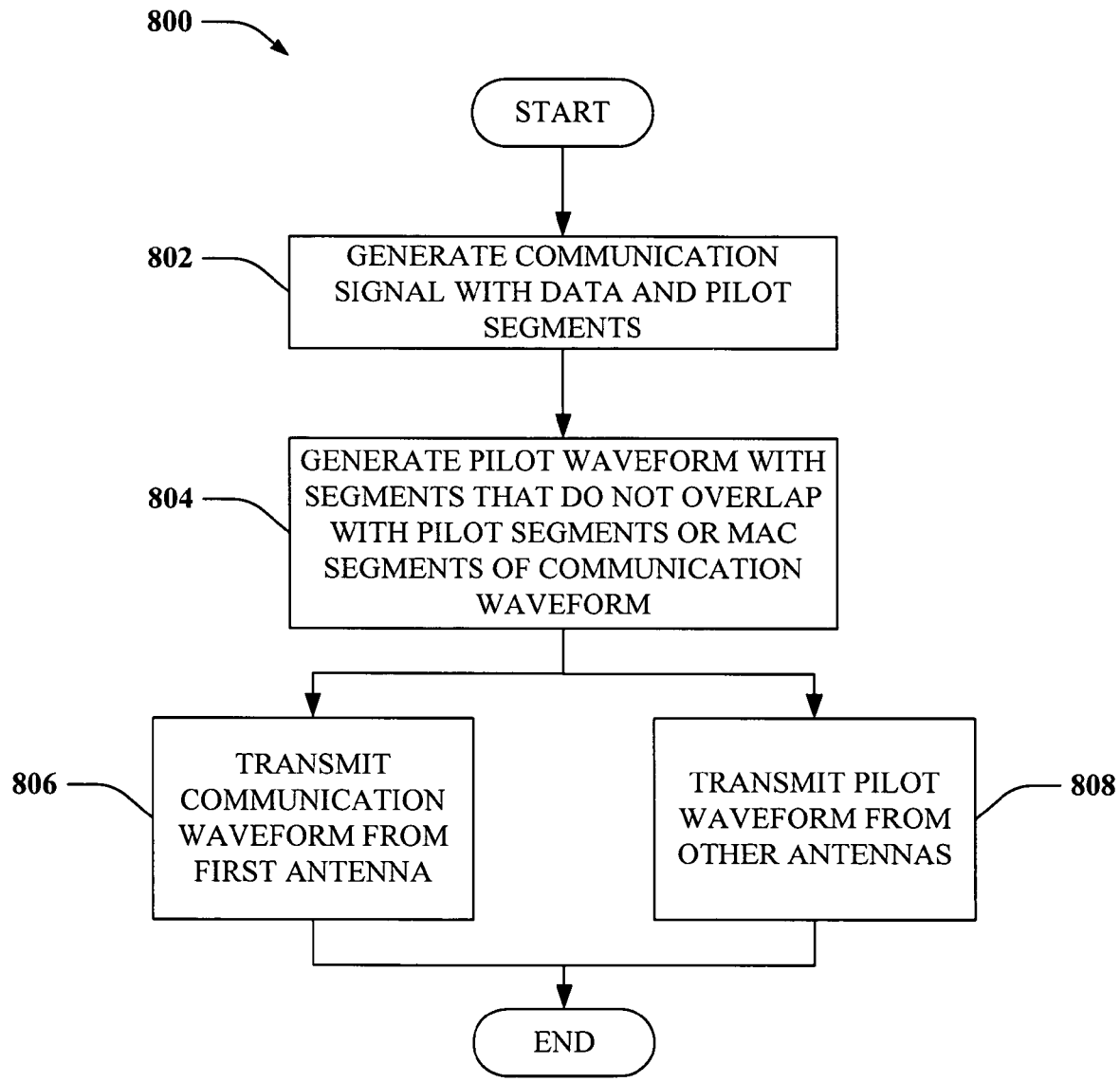
FIG. 8 is an illustration of a methodology for providing improved channel estimation for MIMO user devices without adversely interfering with extant SISO users communicating within the same wireless communication environment, in accordance with one or more aspects.
Figure 9:
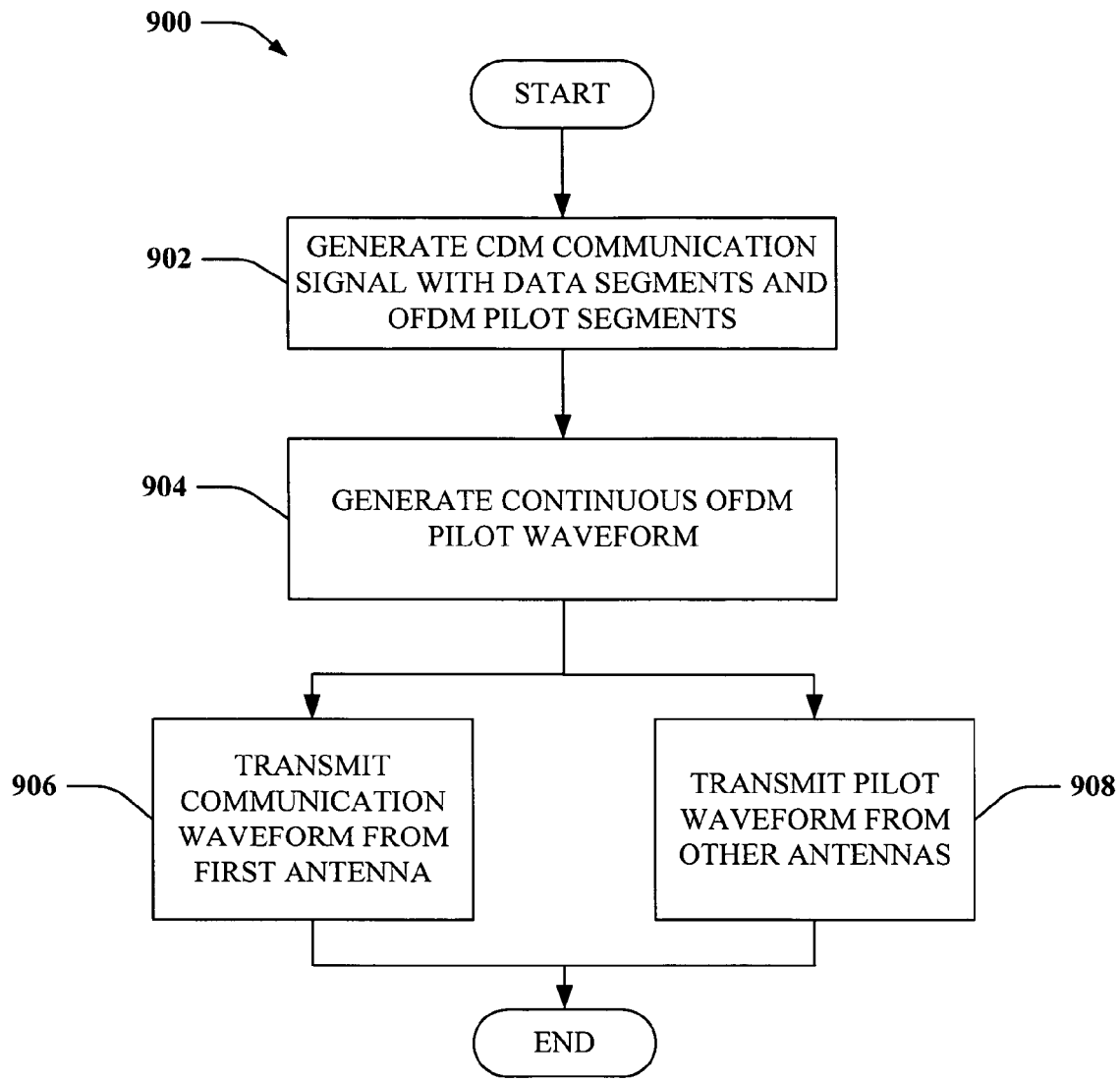
FIG. 9 illustrates a methodology for providing a signal pilot transmission for channel estimation by MIMO user devices without adversely affecting extant SISO users communicating within the same wireless communication environment, in accordance with one or more aspects.

Referring to FIGS. 7-9, methodologies relating to providing an OFDM pilot signal during transmission of a separate CDM communication signal having OFDM pilot segments are illustrated. For example, methodologies can relate to providing the low-power pilot signal in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 7 illustrates a methodology 700 for providing improved channel estimation for MIMO user devices without adversely affecting extant SISO users communicating within the same wireless communication environment, in accordance with one or more aspects. At 702, a first CDM transmission waveform can be generated comprising data segments, OFDM pilot segments, MAC segments, etc., as described with regard to preceding figures. At 704, an OFDM pilot signal can be generated, the pilot signal comprising pilot segments that do not over lap with the pilot segments of the first transmission waveform. In this manner, the pilot signal can be designed to mitigate any interference occurrences between itself and pilot segments of the first waveform.

At 706, the first transmission waveform can be transmitted from a first transmission antenna. Such transmission can be performed at a predefined power level, which can be any suitable power level, as will be appreciated by those skilled in the art. Concurrently, at 708, the pilot waveform can be transmitted from a second antenna. The power level at which the pilot waveform is transmitted can be the same power level at which the first transmission waveform is transmitted without adversely interfering with pilot segments in the transmission waveform. For instance, discontinuities in the pilot waveform can be aligned with the pilot segments of the transmission waveform in order to mitigate interference there between. Additionally and/or alternatively, the pilot waveform can be transmitted at a lower power level than the first transmission waveform to facilitate minimizing resource expenditure in transmission of the pilot waveform. Thus, the pilot signal can be received at a user device employing a MIMO protocol to facilitate improving channel estimation thereby without interfering with the first transmission signal and its reception by a user device employing a SISO protocol in the same communication sector.

It will be appreciated that transmission of the pilot waveform at 708 need not occur upon every transmission of the first waveform at 706, but rather can additionally occur on a periodic basis that does not correspond to every CDM transmission at 706. For instance, the pilot waveform can be transmitted at 708 upon every other transmission of the first waveform, upon every third transmission, upon transmission of a pre-specified number or group of first waveforms, or any other desired permutation of transmissions of the CDM waveform. Additionally, the pattern with which pilot waveforms are transmitted can be varied according to detected and/or monitored constraints, such as loading and the like.

FIG. 8 is an illustration of a methodology 800 for providing improved channel estimation for MIMO user devices without adversely interfering with extant SISO users communicating within the same wireless communication environment, in accordance with one or more aspects. At 802, a first CDM communication waveform can be generated comprising data segments, OFDM pilot segments, MAC segments, etc., as described with regard to preceding figures. At 804, a separate OFDM pilot signal can be generated, the pilot signal comprising pilot segments that do not overlap with the pilot segments of the first communication waveform. Additionally, the pilot signal can be generated in such a manner that pilot segments therein do not overlap with all or a portion of MAC segments in the first communication signal. In this manner, the pilot signal can be designed to mitigate interference between itself and pilot segments and MAC segments of the first waveform.

At 806, the first communication waveform can be transmitted from a first transmission antenna. Such transmission can be performed at a predefined power level, which can be any suitable power level, as will be appreciated by those skilled in the art. Concurrently, at 808, the pilot waveform can be transmitted from a second antenna. The power level at which the pilot waveform is transmitted at 808 can be the same power level at which the first transmission waveform is transmitted without adversely interfering with pilot segments in the first transmission waveform. For instance, discontinuities in the pilot waveform can be aligned with the pilot segments and MAC segments of the transmission waveform in order to mitigate interference there between. Additionally and/or alternatively, the pilot waveform can be transmitted at a lower power level than the first transmission waveform to facilitate minimizing resource expenditure in transmission of the pilot waveform. Thus, the pilot signal can be received at a user device employing a MIMO protocol to facilitate improving channel estimation thereby without interfering with the first communication signal and its reception by a user device employing a SISO protocol in the same communication sector.

It will be appreciated that transmission of the pilot waveform at 808 need not occur upon every transmission of the first waveform at 806, but rather can additionally occur on a periodic basis that does not correspond to every CDM transmission at 806. For instance, the pilot waveform can be transmitted at 808 upon every other transmission of the first waveform, upon every third transmission, upon transmission of a pre-specified number or group of first waveforms, or any other desired permutation of the CDM waveform. Additionally, the pattern with which pilot waveforms are transmitted can be varied according to detected and/or monitored constraints, such as loading and the like.

FIG. 9 illustrates a methodology 900 for providing a pilot transmission for channel estimation by MIMO user devices without adversely affecting extant SISO users communicating within the same wireless communication environment, in accordance with one or more aspects. At 902, a CDM communication signal can be generated and can comprise data segments, OFDM pilot segments, and the like as described with regard to preceding figures. The CDM waveform can be received by a SISO user device, as well as by a MIMO device in communication with, for example, a base station serving a sector in which the devices are located. At 904, a continuous OFDM pilot waveform can be generated. In contrast to methods 700 and 800, the pilot waveform generated at 904 does not comprise gaps or discontinuities.

At 906, the CDM waveform can be transmitted from a first transmit antenna at the base station, at a first power level. At 908, the pilot waveform can be transmitted from a second antenna at a second power level. For example, the power level of the pilot waveform can be approximately 15-25 decibels below the CDM waveform. According to certain examples, the power level of the pilot waveform can be approximately 20 decibels lower than that of the CDM waveform. Thus, the pilot signal can be received at a user device employing a MIMO protocol to facilitate improving channel estimation thereby without interfering with the CDM signal and its reception by a user device employing a SISO protocol in the same communication sector.

Transmission of the pilot waveform may occur every time the CDM waveform is transmitted, but is not limited to such transmission frequency. Rather the pilot waveform can be transmitted according to a pattern that corresponds to, for instance, every other CDM waveform transmission, transmission of a group of N CDM waveform transmission, where N is an integer, or any other suitable or desired permutation of CDM waveform transmissions. Additionally, the frequency with which the pilot waveform is transmitted with regard to that of the CDM waveform can be varied in response to monitored parameters, such as loading, resource availability, and the like. Furthermore, transmission of the pilot waveform can be suspended and/or terminated upon a change from a relatively lower-throughput modulation format to a higher-throughput modulation format (e.g., from QPSK to 64-QAM, etc.), in order to mitigate interference.

According to a related aspect, the pilot waveform can be transmitted at a power level similar to that of the CDM waveform except during transmission of the OFDM pilot segments of the CDM waveform. Rather, during such transmission intervals, transmission power of the pilot waveform can be reduced (e.g., to 20 dB below CDM waveform transmission power, or some other level, . . . ) in order to mitigate interference. In the event that there is overlap between the pilot waveform and pilot segments of the CDM waveform, interference can be mitigated because the pilot segments of the CDM waveform are OFDM, and thus can occupy the same time space because they utilize different carrier frequencies.

It will be appreciated that, in accordance with one or more aspects described herein, inferences can be made regarding power level of the pilot signal transmission, overlap between pilot segments in the pilot transmission signal and pilot and/or MAC segments in the first transmission signal etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding whether to transmit a low-power pilot waveform. For instance, a determination can be made regarding whether one or more MIMO user devices are present in a sector of a communication environment, in addition to one or more SISO user devices. If no MIMO devices are present, then the low-power pilot waveform need not be transmitted, which can conserve resources associated with such transmission, as well as resources associated with any device trying to receive and/or demodulate such transmission. Conversely, if at least one MIMO device is determined to be present in the sector, then the low-power pilot waveform can be transmitted to facilitate providing such pilot information to the MIMO device for improved channel estimation and the like. Because the pilot waveform is transmitted at a power level substantially below that of a regular data transmission, the pilot waveform can be cost-effectively transmitted without interfering with the data waveform.

According to another example, inferences can be made regarding an appropriate power level at which to transmit a low-power pilot waveform. For instance, it may be inferred that the low-power pilot waveform should be transmitted at a power level in the range of approximately 10-30 dB below a data waveform transmission power level in order to conserve system resources and/or mitigate interference between the pilot waveform and the data waveform. According to a related example, it may be determined that a pilot waveform transmission at approximately 15-25 dB below the data waveform transmission power level is desirable. It will be appreciated that the foregoing examples are illustrative in nature and are not intended to limit the number of inferences that can be made or the manner in which such inferences are made in conjunction with the various embodiments and/or methods described herein.

Figure 10:
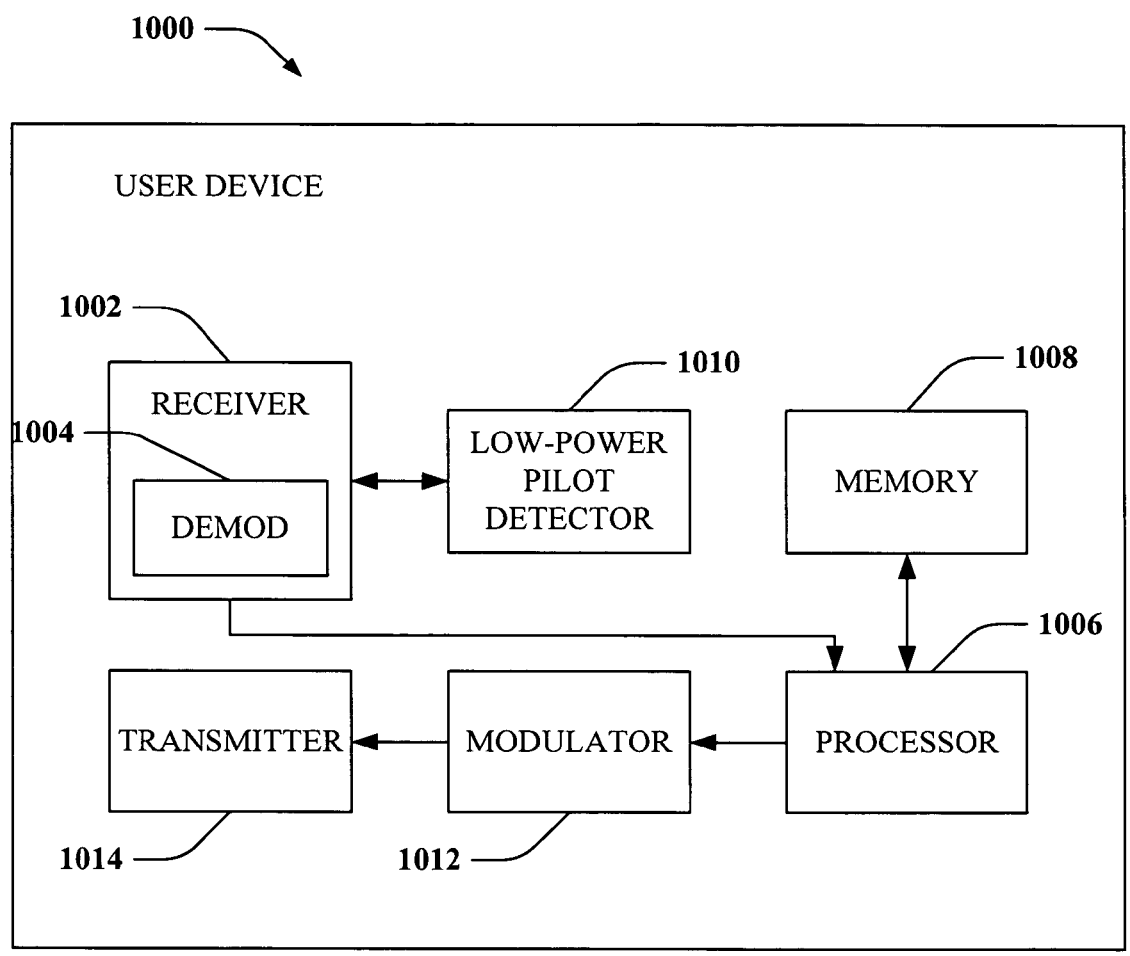
FIG. 10 is an illustration of a user device that facilitates detecting a low-power pilot signal that can be utilized to estimate a channel for a higher-power communication signal in a wireless communication environment, in accordance with one or more aspects set forth herein.

FIG. 10 is an illustration of a user device 1000 that facilitates detecting a low-power pilot signal that can be utilized to estimate a channel for a higher-power communication signal in a wireless communication environment, in accordance with one or more aspects set forth herein. User device 1000 comprises a receiver 1002 that receives a signal from, for instance, one or more receive antennas (not shown), and performs typical actions thereon (e.g., filters, amplifies, downconverts, etc.) the received signal and digitizes the conditioned signal to obtain samples. Receiver 1002 can be, for instance, an MMSE receiver or the like. A demodulator 1004 can demodulate and provide received pilot symbols to a processor 1006 for channel estimation. Processor 1006 can be a processor dedicated to analyzing information received by receiver 1002 and/or generating information for transmission by a transmitter 1014, a processor that controls one or more components of user device 1000, and/or a processor that both analyzes information received by receiver 1002, generates information for transmission by transmitter 1014, and controls one or more components of user device 1000.

User device 1000 can additionally comprise memory 1008 that is operatively coupled to processor 1006 and that stores information related to power levels associated with different waveforms received by user device 1000, differences between such power levels, lookup table(s) comprising information related thereto, and any other suitable information for detecting a low-power pilot waveform for channel estimation related to a communication waveform in a wireless communication system as described herein. Memory 1008 can additionally store protocols associated with waveform detection, channel estimation, etc., such that user device 1000 can employ stored protocols and/or algorithms to estimate a channel, etc., as described herein.

It will be appreciated that the data store (e.g., memories) components described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Receiver 1002 is further coupled to a low-power pilot waveform detector 1010 that can facilitate detecting a low-power pilot signal for channel estimation related to a data communication signal. For instance, the pilot waveform detector 1010 can evaluate whether a low-power pilot signal is present, in addition to a data communication signal comprising its own pilot and/or MAC segments, and can facilitate reception and/or demodulation thereof to glean information that can be utilized to estimate a channel for the data communication signal. User device 1000 still further comprises a symbol modulator 1012 and a transmitter 1014 that transmits the modulated signal.

Figure 11:
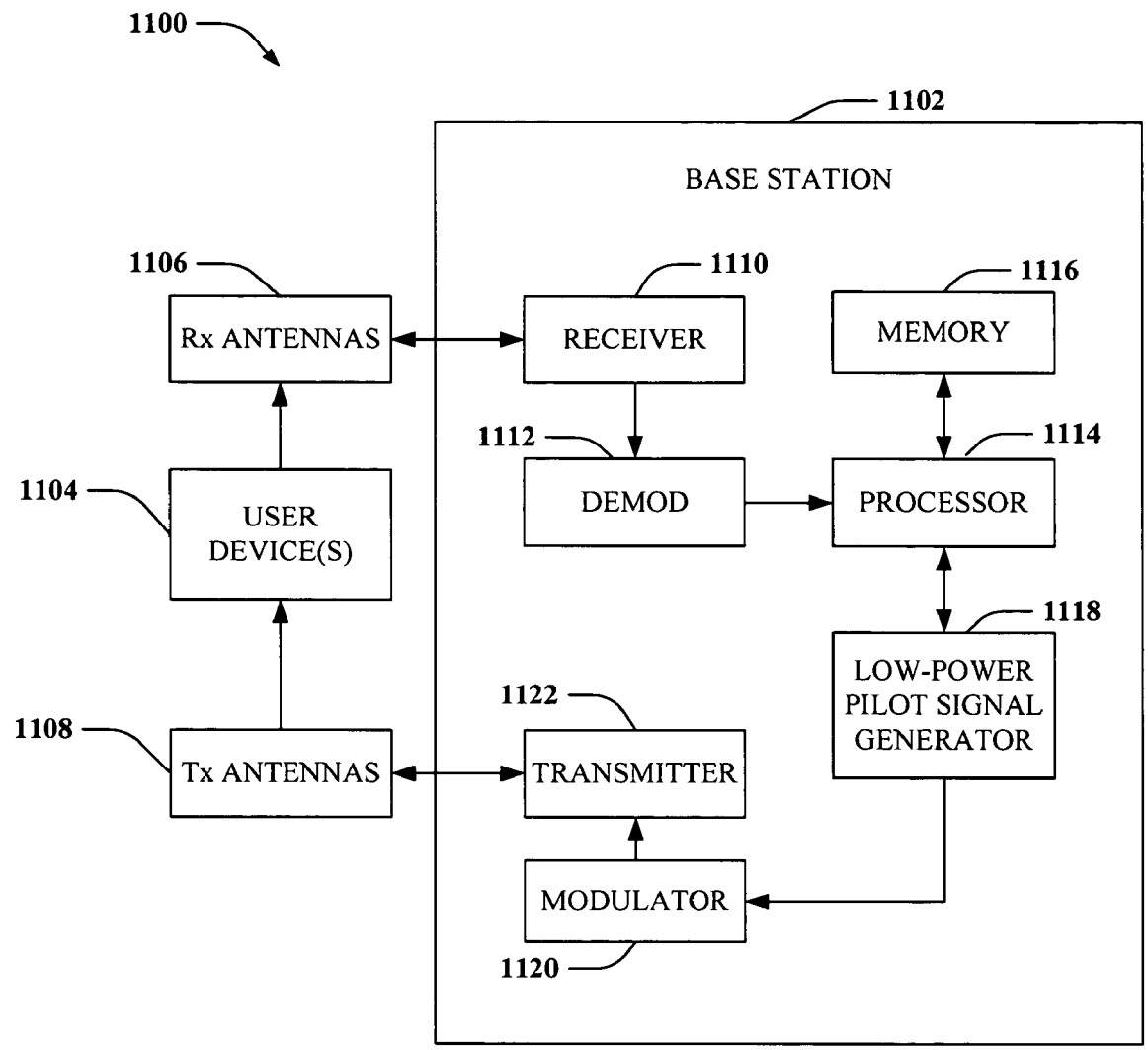
FIG. 11 is an illustration of a system that facilitates providing a low-power pilot signal that can be utilized to estimate a channel for a higher-power communication signal in a wireless communication environment, in accordance with various aspects.

FIG. 11 is an illustration of a system 1100 that facilitates providing a low-power pilot signal that can be utilized to estimate a channel for a higher-power communication signal in a wireless communication environment, in accordance with various aspects. System 1100 comprises a base station 1102 with a receiver 1110 that receives signal(s) from one or more user devices 1104 through a plurality of receive antennas 1106, and a transmitter 1124 that transmits to the one or more user devices 1104 through a transmit antenna 1108. Receiver 1110 can receive information from receive antennas 1106 and is operatively associated with a demodulator 1112 that demodulates received information. Demodulated symbols are analyzed by a processor 1114 that is similar to the processor described above with regard to FIG. 11, and which is coupled to a memory 1116 that stores information related to pilot waveforms, transmission power levels, lookup tables related thereto, and/or any other suitable information related to performing the various actions and functions set forth herein. Processor 1114 is further coupled to a low-power pilot signal generator 1118 that can generate a pilot waveform as described above with regard to preceding figures. The low-power waveforms can be constructed with pilot segments that do not overlap with pilot segments in a data transmission. According to another aspect, the pilot segments of the low-power waveform can be designed such that there is no overlap with the pilot segments of the data transmission as well as some or all of one or more MAC segments in the data transmission. Additionally, the low-power pilot waveforms can be transmitted at approximately 20 dB below the power level of the data transmission. The data transmission and the low-power pilot waveform can be concurrently transmitted from separate transmit antennas 1108.

A modulator 1122 can multiplex a signal for transmission by a transmitter 1124 through transmit antenna 1108 to user devices 1104. In this manner, base station 1102 can interact with a plurality of user devices 1104, such that a SISO user device can receive the data transmission and employ pilot segments therein to estimate a channel there for, while a MIMO user device can receive the data transmission as well as the low-power pilot waveform, which can be utilized to more accurately estimate a channel for the data transmission without interfering with the data transmission itself, as received at the SISO user device.

Figure 12:
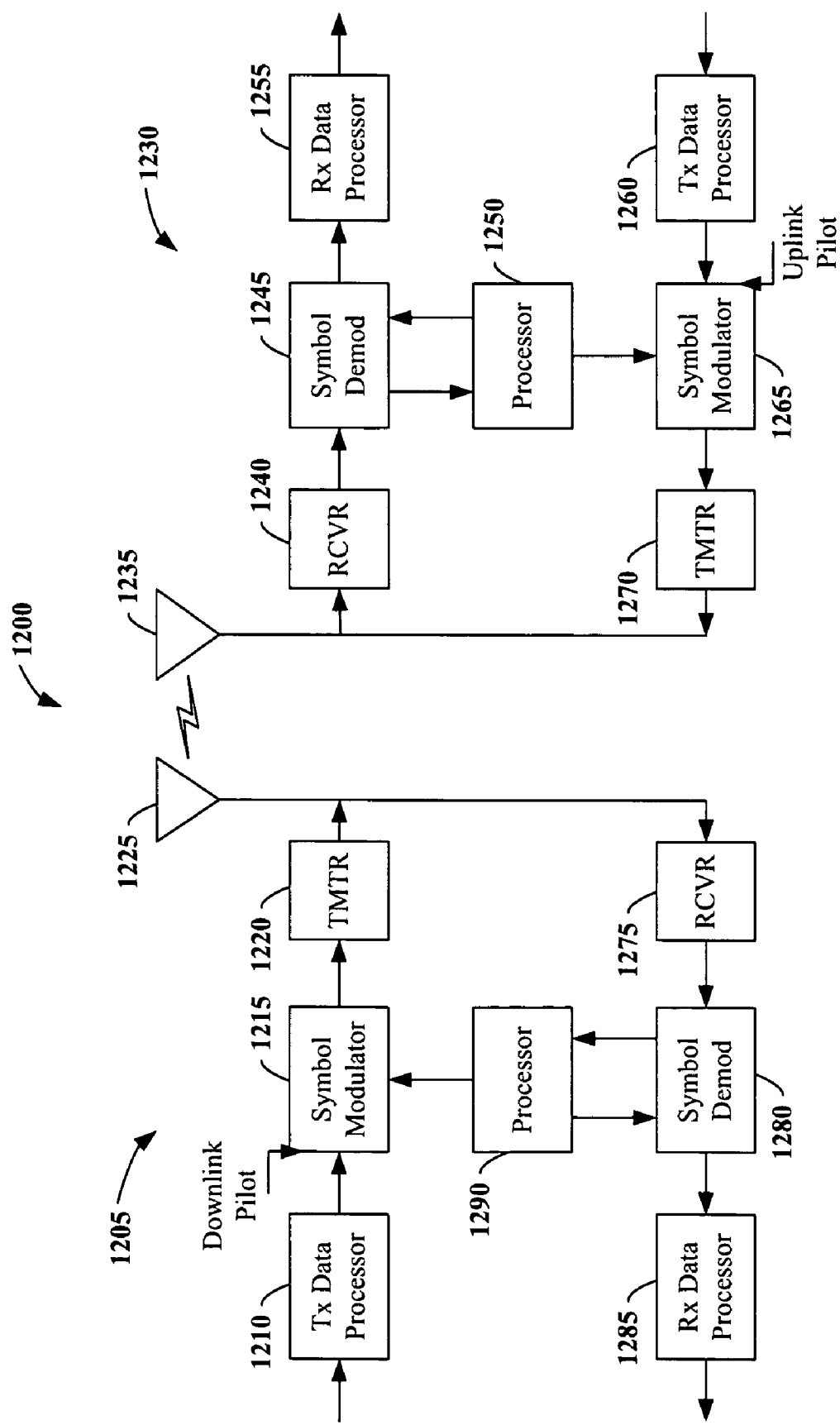
FIG. 12 is an illustration of a wireless network environment that can be employed in conjunction with the various systems and methods described herein.

FIG. 12 shows an exemplary wireless communication system 1200. The wireless communication system 1200 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-5 and 9-10) and/or methods (FIGS. 6-8) described herein to facilitate wireless communication there between.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1220 multiplexes data and pilot symbols and provides them to a transmitter unit (TMTR) 1220. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink. Multiple terminals may transmit pilot concurrently on the uplink on their respective assigned sets of pilot subbands, where the pilot subband sets may be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of performing pilot communication in a wireless communication environment, comprising:
    transmitting a code-division multiplexed (CDM) waveform that is continuous from at least one antenna at a base station; and
    transmitting a second waveform comprising pilot information related to the CDM waveform from at least one other antenna at the base station;
    wherein the second waveform comprises an OFDM waveform, and the pilot information in the second waveform temporally overlaps one of traffic channel information and control channel information in the CDM waveform.

2. The method of claim 1, the second waveform comprises pilot segments that are employed to estimate a channel for a multiple-input, multiple-output (MIMO) user device.

3. The method of claim 1, the second waveform is discontinuous and the pilot segments of the second waveform do not overlap pilot segments of the CDM waveform.

4. The method of claim 1, the second waveform is discontinuous and the pilot segments of the second waveform do not overlap pilot segments or medium access channel (MAC) segments in the CDM waveform.

5. The method of claim 1, further comprising providing the second waveform in fewer than all interlaces comprising the CDM waveform.

6. The method of claim 1, further comprising providing the second waveform according to a predetermined pattern.

7. The method of claim 6, wherein the predetermined pattern comprises transmitting the second waveform once every N transmissions of the CDM waveform, where N is an integer greater than 1.

8. The method of claim 1, further comprising transmitting the second waveform according to a pattern that is based at least in part on a data rate of the CDM waveform.

9. The method of claim 1, further comprising transmitting the second waveform according to a pattern that is based at least in part on a spectral efficiency of the CDM waveform.

10. The method of claim 1, further comprising transmitting the second waveform at a power level approximately 15 dB to 25 dB below a power level at which the CDM waveform is transmitted, wherein the second waveform is a continuous waveform.

11. The method of claim 1, further comprising transmitting the second waveform at a power level approximately 20 dB below a power level at which the first waveform is transmitted, wherein the second waveform is a continuous waveform.

12. The method of claim 1, further comprising terminating transmission of the second waveform upon switching from a low-throughput modulation format to a high-throughput modulation format for transmission of the CDM waveform.

13. The method of claim 1, further comprising terminating transmission of the second waveform upon switching from a quadrature phase shift keying (QPSK) modulation format to a 64-quadrature amplitude modulation (QAM) format for transmission of the CDM waveform.

14. The method of claim 1, wherein the first waveform comprises portions transmitted from at least two antennas at the base station during a given time period and the second waveform comprises portions transmitted from the same at least two antennas at the base station during the given time period, wherein the first waveform and second waveform are mapped to the at least two antennas according to a linear combination.

15. The method of claim 14, wherein the first waveform and the second waveform are mapped to the at least two antennas according to an orthonormal matrix.

16. The method of claim 14, wherein the first waveform and the second waveform are mapped to the at least two antennas and wherein the first waveform and second waveform are mapped to the at least two antennas according to a unitary matrix.

17. An apparatus for wireless communication with a SISO user device having a single antenna and a MIMO user device having a plurality of antennas, comprising:
    a plurality of antennas, wherein one of said antennas provides all wireless signaling used by the SISO user device to recover communication information sent by said apparatus to the SISO user device; and a processor, coupled to the plurality of antennas and configured to transmit a CDM waveform from said one antenna for the SISO user device and the MIMO user device, said CDM waveform comprising OFDM pilot segments, said processor further configured to transmit a second waveform comprising pilot information related to the CDM waveform from at least one other of said plurality of antennas for the MIMO user device.

18. The apparatus of claim 17, the processor generates the CDM waveform as a continuous waveform, comprising data segments and the OFDM pilot segments.

19. The apparatus of claim 18, the second waveform is a continuous waveform.

20. The apparatus of claim 19, the processor instructs transmission of the first waveform at a first power level and the second waveform at a second power level approximately 20 dB below the first power level.

21. The apparatus of claim 17, the first waveform is a continuous waveform, comprising data segments, OFDM pilot segments, and MAC segments.

22. The apparatus of claim 21, the second waveform is a discontinuous waveform comprising OFDM pilot segments that do not overlap with the pilot segments of the CDM waveform.

23. The apparatus of claim 17, the processor instructs transmission of the second waveform according to a predetermined pattern.

24. The apparatus of claim 17, the processor instructs transmission of the second waveform once every N transmissions of the CDM waveform, where N is an integer greater than 1.

25. A wireless communication apparatus for communication with first and second wireless communication devices, comprising:

means for generating a CDM waveform comprising OFDM pilot segments;

means for generating an OFDM pilot waveform; and means for transmitting the CDM waveform from an antenna that provides all wireless signaling used by the first device to recover communication information sent by said wireless communication apparatus to the first device, and for transmitting the OFDM pilot waveform from at least one other antenna for reception at the second device.

26. The apparatus of claim 25, wherein the OFDM pilot waveform is discontinuous and comprises pilot segments that do not overlap with pilot segments in the CDM waveform.

27. The apparatus of claim 25, further comprising means for transmitting the CDM waveform and the OFDM pilot waveform at a substantially similar power level.

28. The apparatus of claim 25, the OFDM pilot waveform is a continuous waveform that comprises pilot segments that overlap with pilot segments in the CDM waveform.

29. The apparatus of claim 25, further comprising means for transmitting the OFDM pilot waveform at a power level approximately 15-25 dB below transmission power level of the CDM waveform.

30. The apparatus of claim 29, further comprising means for transmitting the OFDM pilot waveform at a power level approximately 20 dB below a transmission power level of the CDM waveform.

31. The apparatus of claim 25, wherein the first waveform comprises portions transmitted from at least two antennas at the base station during a given time period and the second waveform comprises portions transmitted from the same at least two antennas at the base station during the given time period, further comprising means for mapping the first waveform and second waveform according to a linear combination.

32. The apparatus of claim 31, wherein means for mapping comprises means for mapping according to an orthonormal matrix.

33. The apparatus of claim 31, wherein means for mapping comprises means for mapping according to a unitary matrix.

34. A computer-readable medium having stored thereon computer-executable instructions for supporting operations of a wireless communication apparatus that communicates with first and second wireless communication devices, said operations comprising:

generating a CDM waveform comprising OFDM pilot segments;

generating an OFDM pilot waveform comprising pilot information related to the CDM waveform; and transmitting the CDM waveform from an antenna that provides all wireless signaling used by the first device to recover communication information sent by said wireless communication apparatus to the first device, and concurrently transmitting the OFDM waveform from at least one other antenna for reception at the second device.

35. The computer-readable medium of claim 34, the instructions further comprising generating the OFDM pilot waveform as a discontinuous waveform with pilot segments that do not overlap pilot segments in the CDM waveform.

36. The computer-readable medium of claim 35, the instructions further comprising transmitting the OFDM pilot waveform and the CDM waveform at a same power level.

37. The computer-readable medium of claim 34, the instructions further comprising generating the OFDM pilot as a continuous waveform comprising pilot segments that overlap with pilot segments in the CDM waveform.

38. The computer-readable medium of claim 37, the instructions further comprising transmitting the OFDM pilot waveform at a power level approximately 15-25 dB below a transmission power level for the CDM waveform.

39. The computer-readable medium of claim 38, the instructions further comprising transmitting the OFDM pilot waveform at a power level approximately 20 dB below a transmission power level for the CDM waveform.

40. A processor that executes instructions that support operations of a wireless communication apparatus that communicates with first and second wireless communication devices, the operations comprising:

generating a CDM waveform that has OFDM pilot segments;

generating an OFDM pilot waveform that has pilot information related to the CDM waveform; and transmitting the CDM waveform from an antenna that provides all wireless signaling used by the first device to recover communication information sent by said wireless communication apparatus to the first device, and transmitting the OFDM pilot waveform from at least one other antenna for reception at the second device.

41. The processor of claim 40, the instructions further comprising generating the OFDM pilot waveform as a discontinuous waveform having discontinuities between pilot segments, wherein the discontinuities are generally aligned with the pilot segments in the CDM waveform.

42. The processor of claim 41, the instructions further comprising transmitting the CDM waveform and the OFDM pilot waveform at approximately the same power level.

43. The processor of claim 40, the instructions further comprising generating the OFDM pilot waveform as a continuous waveform having pilot segments that overlap the pilot segments in the CDM waveform.

44. The processor of claim 43, the instructions further comprising transmitting the OFDM pilot waveform at a power level approximately 15-25 dB below a transmission power level for the CDM waveform.

45. The processor of claim 43, the instructions further comprising transmitting the OFDM pilot waveform at a power level approximately 20 dB below a transmission power level for the CDM waveform.

* * * * *